(12) United States Patent
Akmal et al.

(10) Patent No.: US 11,935,168 B1
(45) Date of Patent: Mar. 19, 2024

(54) SELECTIVE AMPLIFICATION OF VOICE AND INTERACTIVE LANGUAGE SIMULATOR

(71) Applicant: Apple Inc., Cupertino, CA (US)

(72) Inventors: Shiraz Akmal, Playa Vista, CA (US); Aaron M. Burns, Sunnyvale, CA (US); Brad K. Herman, Culver City, CA (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 17/714,590

(22) Filed: Apr. 6, 2022

Related U.S. Application Data

(60) Provisional application No. 63/188,848, filed on May 14, 2021.

(51) Int. Cl.
 *G06T 11/60* (2006.01)
 *G10L 15/00* (2013.01)
 *G10L 15/187* (2013.01)
 *G10L 15/22* (2006.01)

(52) U.S. Cl.
 CPC ............ *G06T 11/60* (2013.01); *G10L 15/005* (2013.01); *G10L 15/187* (2013.01); *G10L 15/22* (2013.01)

(58) Field of Classification Search
 CPC ..... G06T 11/60; G10L 15/005; G10L 15/187; G10L 15/22
 See application file for complete search history.

(56) References Cited

U.S. PATENT DOCUMENTS

| | | | |
|---|---|---|---|
| 9,626,955 | B2 | 4/2017 | Fleizach et al. |
| 9,633,004 | B2 | 4/2017 | Giuli et al. |
| 9,633,660 | B2 | 4/2017 | Haughay |
| 9,633,674 | B2 | 4/2017 | Sinha |
| 9,668,121 | B2 | 5/2017 | Naik et al. |
| 9,697,822 | B1 | 7/2017 | Naik et al. |
| 9,721,566 | B2 | 8/2017 | Newendorp et al. |
| 9,818,400 | B2 | 11/2017 | Paulik et al. |
| 9,858,925 | B2 | 1/2018 | Gruber et al. |
| 9,886,953 | B2 | 2/2018 | Lemay et al. |
| 9,922,642 | B2 | 3/2018 | Pitschel et al. |
| 9,966,065 | B2 | 5/2018 | Gruber et al. |
| 9,966,068 | B2 | 5/2018 | Cash et al. |
| 9,986,419 | B2 | 5/2018 | Naik et al. |
| 10,049,663 | B2 | 8/2018 | Orr et al. |

(Continued)

OTHER PUBLICATIONS

Coulouris et al., "Distributed Systems: Concepts and Design (Fifth Edition)", Addison-Wesley, May 7, 2011, 391 pages.

(Continued)

*Primary Examiner* — Yu Chen
(74) *Attorney, Agent, or Firm* — DLA Piper LLP (US)

(57) ABSTRACT

Systems and processes for operating a digital assistant are provided. An example method includes, at an electronic device having one or more processors and memory, receiving an audio input including an utterance, determining, based on a speaker profile, an identity of a speaker of the utterance, determining whether the identity of the speaker matches a predetermined identity, and in accordance with a determination that the identity of the speaker matches the predetermined identity selectively adjusting a volume of the utterance relative to a volume of other sound of the audio input and providing an output of the adjusted utterance.

54 Claims, 10 Drawing Sheets

(56) References Cited

U.S. PATENT DOCUMENTS

| | | | |
|---|---|---|---|
| 10,049,668 B2 * | 8/2018 | Huang | G10L 15/285 |
| 10,074,360 B2 | 9/2018 | Kim | |
| 10,083,690 B2 | 9/2018 | Giuli et al. | |
| 10,089,072 B2 | 10/2018 | Piersol et al. | |
| 10,102,359 B2 | 10/2018 | Cheyer | |
| 10,169,329 B2 | 1/2019 | Futrell et al. | |
| 10,170,123 B2 | 1/2019 | Orr et al. | |
| 10,176,167 B2 | 1/2019 | Evermann | |
| 10,185,542 B2 | 1/2019 | Carson et al. | |
| 10,186,254 B2 | 1/2019 | Williams et al. | |
| 10,192,552 B2 | 1/2019 | Raitio et al. | |
| 10,199,051 B2 | 2/2019 | Binder et al. | |
| 10,223,066 B2 | 3/2019 | Martel et al. | |
| 10,249,300 B2 | 4/2019 | Booker et al. | |
| 10,269,345 B2 | 4/2019 | Castillo Sanchez et al. | |
| 10,297,253 B2 | 5/2019 | Walker, II et al. | |
| 10,311,871 B2 | 6/2019 | Newendorp et al. | |
| 10,475,446 B2 | 11/2019 | Gruber et al. | |
| 10,497,365 B2 | 12/2019 | Gruber et al. | |
| 10,568,032 B2 | 2/2020 | Freeman et al. | |
| 10,659,851 B2 | 5/2020 | Lister et al. | |
| 10,671,428 B2 | 6/2020 | Zeitlin | |
| 10,706,841 B2 | 7/2020 | Gruber et al. | |
| 10,791,176 B2 | 9/2020 | Phipps et al. | |
| 10,978,090 B2 | 4/2021 | Binder et al. | |
| 11,232,645 B1 * | 1/2022 | Roche | G06V 20/20 |
| 2019/0139430 A1 * | 5/2019 | Ghatage | G06F 40/58 |
| 2019/0139448 A1 * | 5/2019 | Marshall | G06F 16/907 |
| 2019/0303442 A1 * | 10/2019 | Peitz | G10L 15/1822 |
| 2019/0311640 A1 * | 10/2019 | Merwin | G09B 19/06 |
| 2020/0105260 A1 * | 4/2020 | Piernot | G06F 3/04886 |
| 2021/0224319 A1 * | 7/2021 | Ingel | G06F 16/686 |
| 2022/0293008 A1 * | 9/2022 | Sha | G06F 3/012 |

OTHER PUBLICATIONS

Navigli Roberto, "Word Sense Disambiguation: A Survey", ACM Computing Surveys, vol. 41, No. 2, Article 10, Feb. 2009, 69 pages.

Phoenix Solutions, Inc., "Declaration of Christopher Schmandt Regarding the MIT Galaxy System", West Interactive Corp., a Delaware Corporation, Document 40, Jul. 2, 2010, 162 pages.

\* cited by examiner

SELECTIVE AMPLIFICATION OF VOICE AND INTERACTIVE LANGUAGE SIMULATOR

CROSS-REFERENCE TO RELATED APPLICATIONS

This application claims priority to U.S. Provisional Application No. 63/188,848, filed May 14, 2021, entitled "SELECTIVE AMPLIFICATION OF VOICE AND INTERACTIVE LANGUAGE SIMULATOR," the entire contents of which are hereby incorporated by reference.

FIELD

This relates generally to digital assistants and, more specifically, to selectively amplifying audio inputs and providing an interactive language simulator with a digital assistant.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user. In some cases, users may interact with digital assistants to augment interactions with other people around the user or to provide interactions that are not readily available to the user. Accordingly, efficient ways for the digital assistant to selectively augment interactions with other people around the user or to provide new interactions are desirable.

SUMMARY

Example methods are disclosed herein. An example method includes, at an electronic device having one or more processors and memory, receiving an audio input including an utterance, determining, based on a speaker profile, an identity of a speaker of the utterance, determining whether the identity of the speaker matches a predetermined identity, and in accordance with a determination that the identity of the speaker matches the predetermined identity selectively adjusting a volume of the utterance relative to a volume of other sound of the audio input and providing an output of the adjusted utterance.

Example non-transitory computer-readable media are disclosed herein. An example non-transitory computer-readable storage medium stores one or more programs. The one or more programs include instructions for receiving an audio input including an utterance, determining, based on a speaker profile, an identity of a speaker of the utterance, determining whether the identity of the speaker matches a predetermined identity, and in accordance with a determination that the identity of the speaker matches the predetermined identity selectively adjusting a volume of the utterance relative to a volume of other sound of the audio input and providing an output of the adjusted utterance.

Example electronic devices are disclosed herein. An example electronic device comprises one or more processors; a memory; and one or more programs, where the one or more programs are stored in the memory and configured to be executed by the one or more processors, the one or more programs including instructions for receiving an audio input including an utterance, determining, based on a speaker profile, an identity of a speaker of the utterance, determining whether the identity of the speaker matches a predetermined identity, and in accordance with a determination that the identity of the speaker matches the predetermined identity selectively adjusting a volume of the utterance relative to a volume of other sound of the audio input and providing an output of the adjusted utterance.

An example electronic device comprises means for receiving an audio input including an utterance, means for determining, based on a speaker profile, an identity of a speaker of the utterance, means for determining whether the identity of the speaker matches a predetermined identity, and in accordance with a determination that the identity of the speaker matches the predetermined identity means for selectively adjusting a volume of the utterance relative to a volume of other sound of the audio input and means for providing an output of the adjusted utterance.

In accordance with a determination that the identity of the speaker matches the predetermined identity selectively adjusting a volume of the utterance relative to a volume of other sound of the audio input and providing an output of the adjusted utterance allows the digital assistant to efficiently and accurately determine which utterances spoken to a user need to be adjusted to allow the user to hear them quickly. Accordingly, the digital assistant may provide more services to a user while the user is engaged with the digital assistant and a virtual reality device without interruption. This increases the efficiency of the digital assistant, as the digital assistant will not have to repeatedly process user requests to determine who is talking to them or what is being said. Additionally, this allows the digital assistant to continuously provide services without interruption reducing the power consumption caused when the device or the digital assistant must start and stop and improving the battery life of the electronic device.

Example methods are disclosed herein. An example method includes, at an electronic device having one or more processors and memory, receiving an audio input including a user request in a first language, determining, based on the user request, a procedurally generated virtual environment and a second language responsive to the request, providing the procedurally generated virtual environment including one or more objects labeled in the second language, and providing a spoken output using the second language.

Example non-transitory computer-readable media are disclosed herein. An example non-transitory computer-readable storage medium stores one or more programs. The one or more programs include instructions for receiving an audio input including a user request in a first language, determining, based on the user request, a procedurally generated virtual environment and a second language responsive to the request, providing the procedurally generated virtual environment including one or more objects labeled in the second language, and providing a spoken output using the second language.

Example electronic devices are disclosed herein. An example electronic device comprises one or more processors; a memory; and one or more programs, where the one or more programs are stored in the memory and configured to be executed by the one or more processors, the one or more programs including instructions for receiving an audio input including a user request in a first language, determining, based on the user request, a procedurally generated virtual environment and a second language responsive to the request, providing the procedurally generated virtual environment including one or more objects labeled in the second language, and providing a spoken output using the second language.

An example electronic device comprises means for receiving an audio input including a user request in a first language, means for determining, based on the user request, a procedurally generated virtual environment and a second language responsive to the request, means for providing the procedurally generated virtual environment including one or more objects labeled in the second language, and means for providing a spoken output using the second language.

Determining, based on the user request, a procedurally generated virtual environment and a second language responsive to the request, and providing the procedurally generated virtual environment including one or more objects labeled in the second language allow the digital assistant to provide an immersive language simulator experience to help a user learn new languages on demand. Additionally, the digital assistant may determine and provide the virtual environment based on a simply command, increasing the efficiency of the digital assistant as the user does not need to go through many different menus or interactions to set up the virtual environment and instead the virtual environment can be procedurally generated automatically based on a simple input. This allows the digital assistant to more efficiently provide the desired response to the user, reducing the power consumption of the digital assistant and improving the battery life of the electronic device.

DESCRIPTION

Figure 1A:
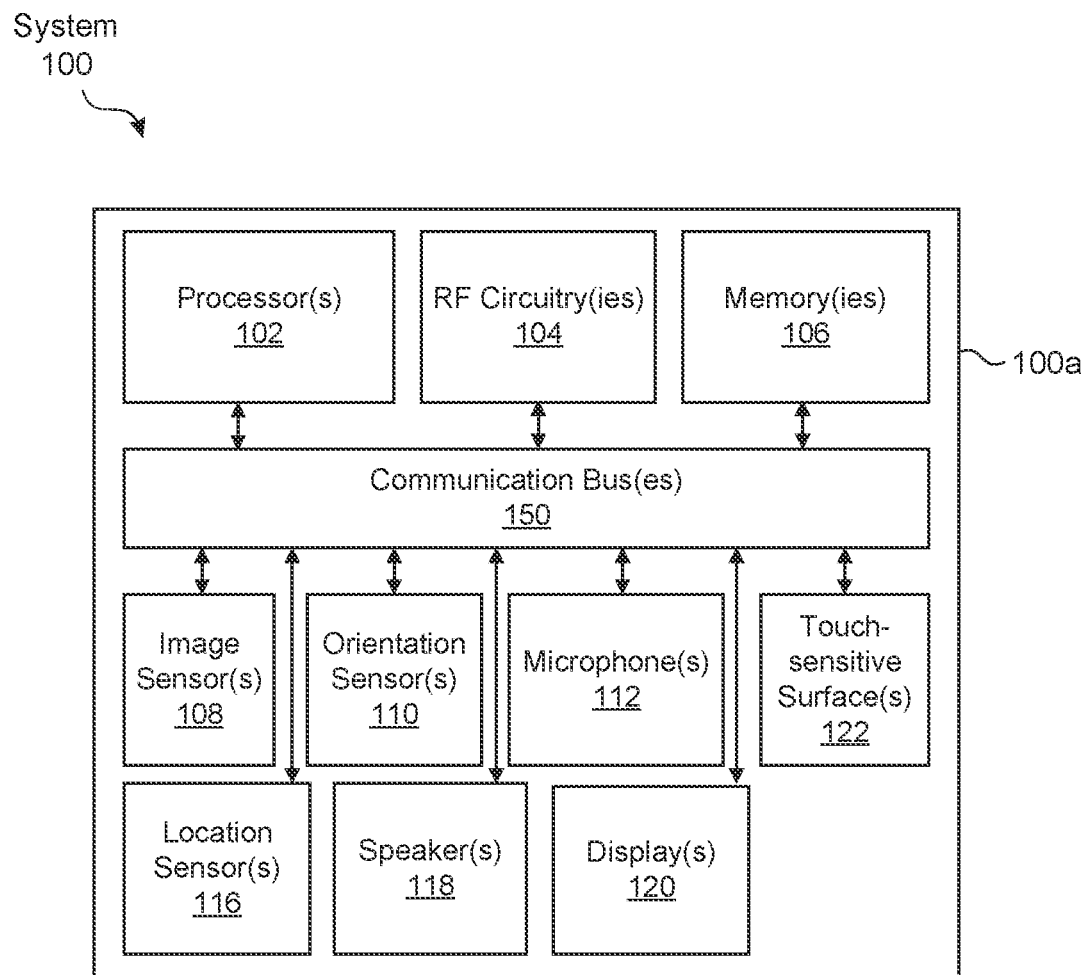
FIGS. 1A-1B depict exemplary systems for use in various computer-generated reality technologies, including virtual reality and mixed reality.

Various examples of electronic systems and techniques for using such systems in relation to various computer-generated reality technologies are described.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR Include Virtual Reality and Mixed Reality

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of Mixed Realities Include Augmented Reality and Augmented Virtuality An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
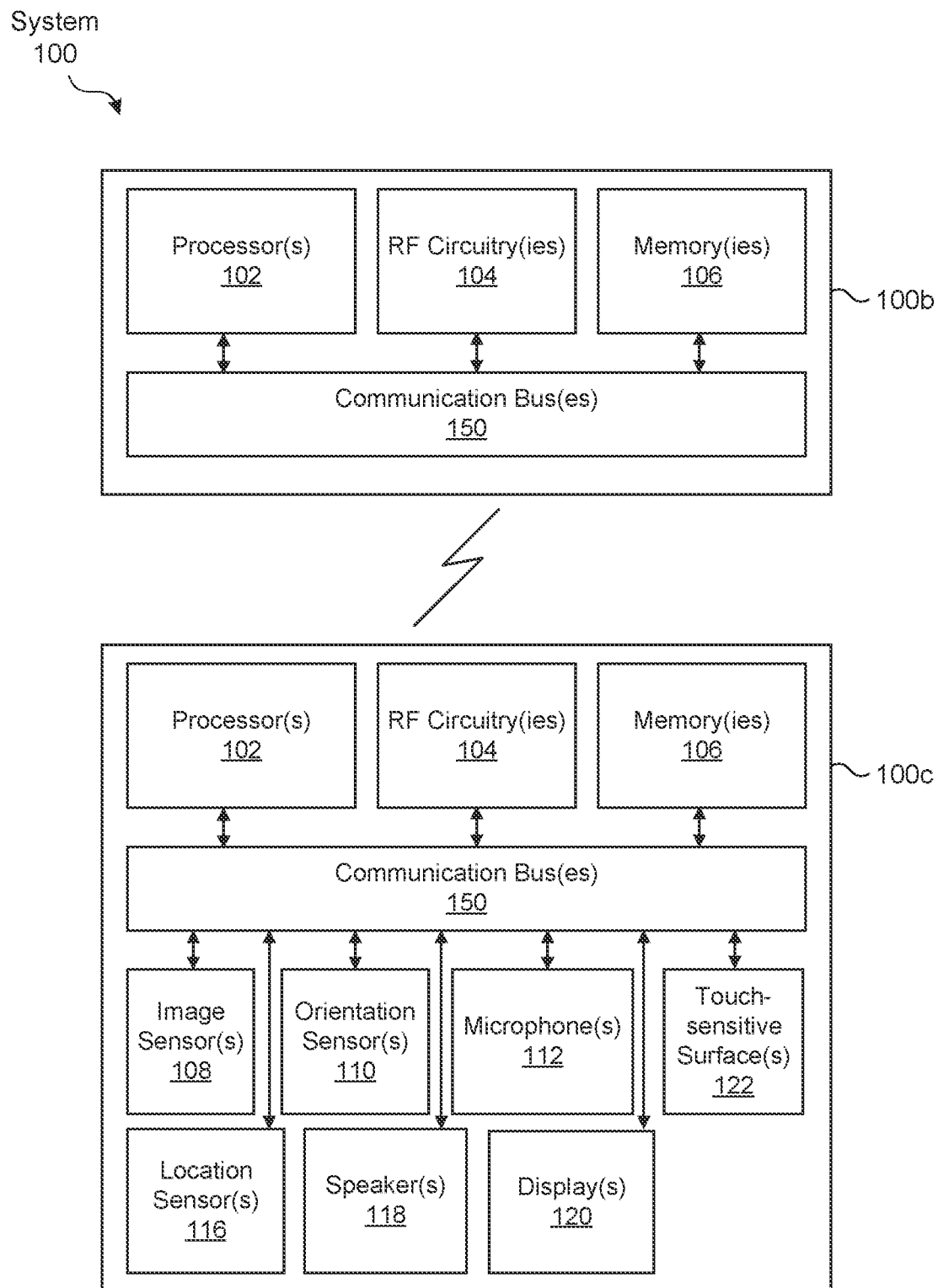

FIG. 1A and FIG. 1B depict exemplary system 100 for use in various computer-generated reality technologies.

In some examples, as illustrated in FIG. 1A, system 100 includes device 100*a*. Device 100*a* includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*a*.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100*a* is implemented in a base station device or a HMD device.

As illustrated in FIG. 1B, in some examples, system 100 includes two (or more) devices in communication, such as through a wired connection or a wireless connection. First device 100*b* (e.g., a base station device) includes processor(s) 102, RF circuitry(ies) 104, and memory(ies) 106. These components optionally communicate over communication bus(es) 150 of device 100*b*. Second device 100*c* (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*c*.

In some examples, system 100 is a mobile device. In some examples, system 100 is a head-mounted display (HMD) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Figure 2:
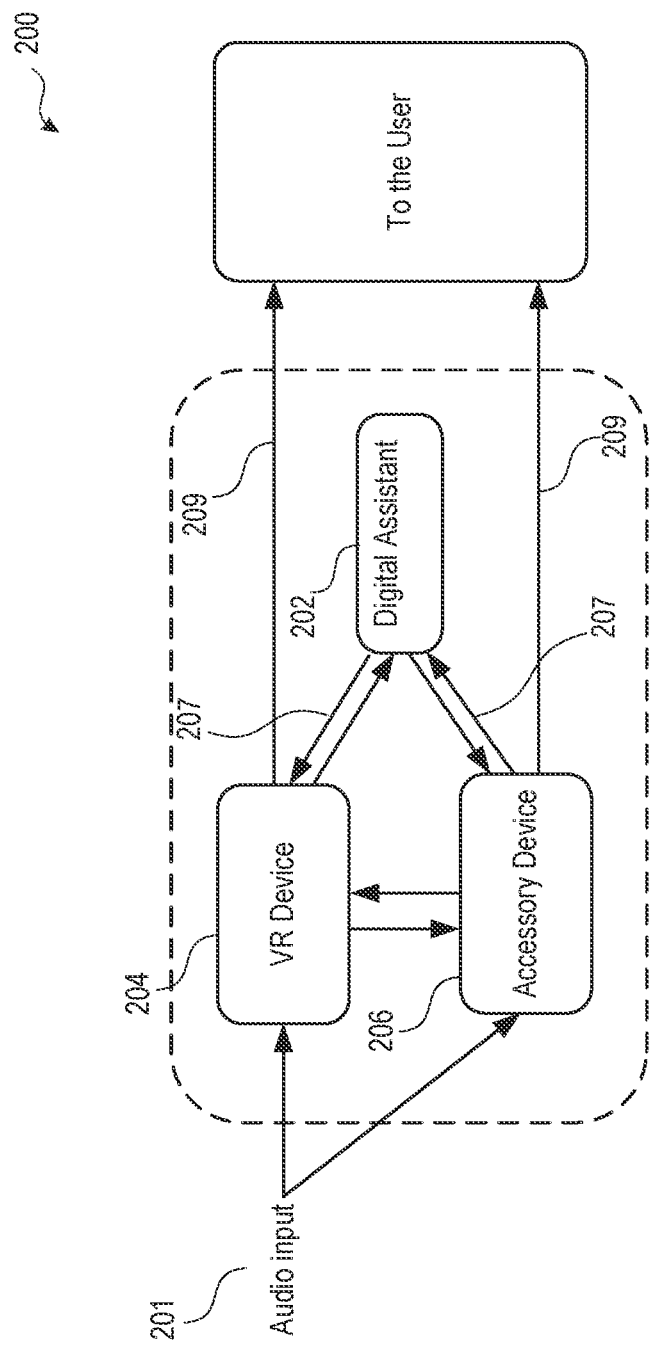
FIG. 2 depicts an exemplary system for selectively adjusting audio input, according to various examples.

FIG. 2 depicts exemplary system 200 for providing selective adjustment of voice inputs, according to various examples. In some examples, as illustrated in FIG. 2, system 200 includes digital assistant 202, VR device 204, and accessory device 206. In some examples, these components of system 200 may optionally be combined (e.g., VR device 204 may include accessory device 206) or connected as discussed further below. In some examples, digital assistant 202 is implemented on one or more of the devices included in system 200, such as VR device 204 or accessory device 206. In some examples, digital assistant 202 is implemented across other devices (e.g., a server) in addition to the devices depicted in system 200. In some examples, some of the modules and functions of the digital assistant are divided into a server portion and a client portion, where the client portion resides on one or more user devices (e.g., electronic device 100, VR device 204, and accessory device 206) and communicates with the server portion through one or more networks.

It should be noted that system 200 is only one example of such a system, and that system 200 can have more or fewer devices than shown, can combine two or more devices, or can have a different configuration or arrangement of the devices. Digital assistant 202 is implemented in hardware, software instructions for execution by one or more processors, firmware, including one or more signal processing and/or application specific integrated circuits, or a combination thereof. In some examples, digital assistant 202 connects to one or more components and/or sensors of VR device 204 and accessory device 206 as discussed further below.

System 200 uses the various devices depicted, including VR device 204 and accessory device 206, to monitor the surroundings of a user to receive utterances and determine whether the volume of the utterances should be adjusted based on the identity of the speaker of the utterance. System 200 may then provide the adjusted utterances to the user so that the user receives utterances in a way that is more comfortable and easier to understand at an appropriate volume.

Figure 3:
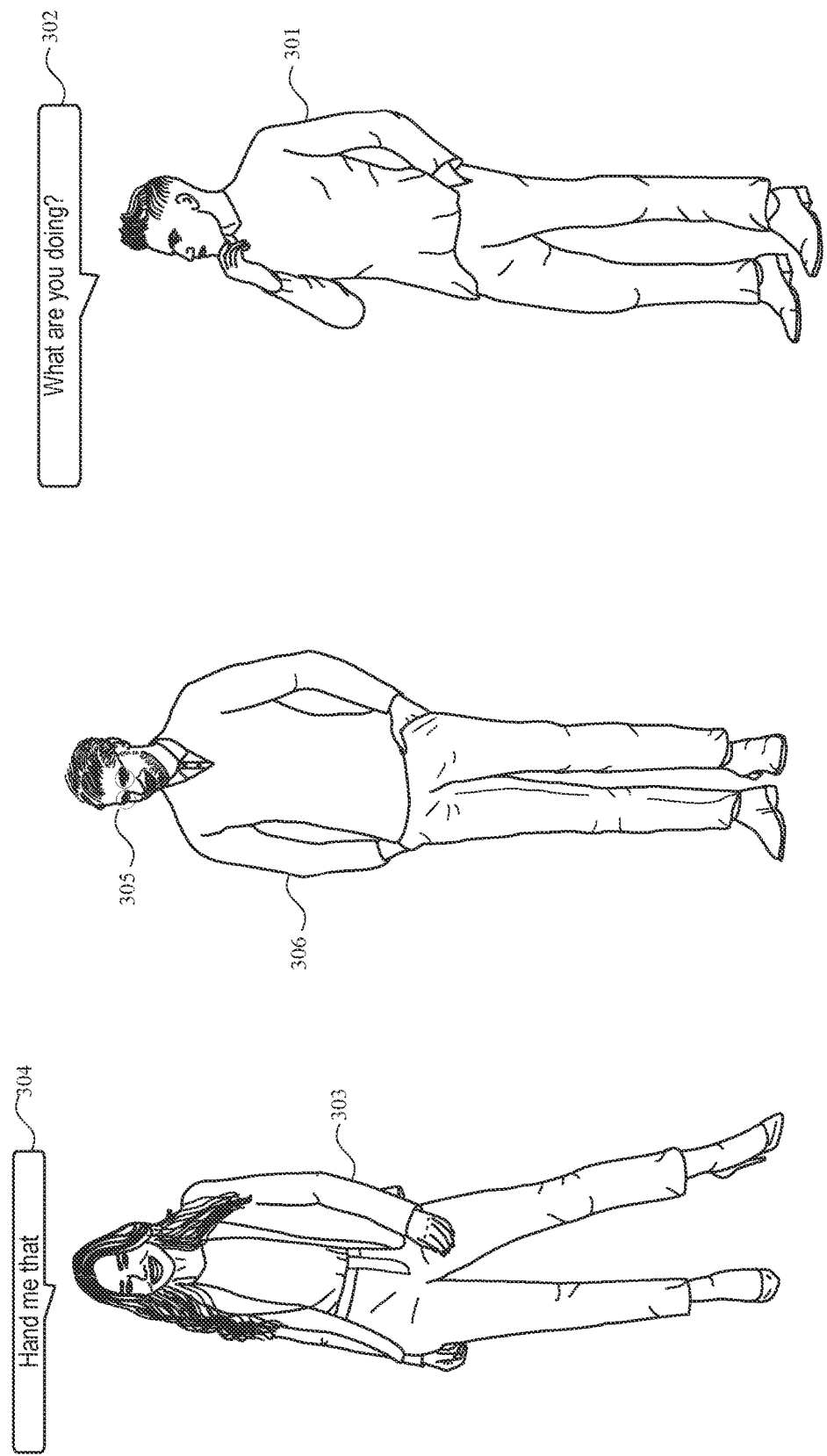
FIG. 3 depicts an exemplary environment for selectively adjusting audio input, according to various examples.

System 200, and in particular VR device 204 and/or accessory device 206, receive audio input 201 that includes an utterance, such as utterance 302 of "What are you doing?" provided by speaker 301 or utterance 304 of "Hand me that" provided by speaker 303 as shown in FIG. 3.

In some examples, audio input 201 includes multiple utterances. For example, as discussed above, audio input 201 could include both utterance 302 and utterance 304. In some examples, such as the example discussed above, both of the utterances are provided by different speakers (e.g., speaker 301 and 303). Thus, a first utterance (e.g., utterance 302) is received from a first speaker (e.g., speaker 301) and a second utterance (e.g., utterance 304) is received from a second speaker (e.g., speaker 303). In some examples, the multiple utterances are received from the same speaker. For example, VR device 305 may receive utterance 302 of "what are you doing?" from speaker 301 as shown in FIG. 3 and then receive another utterance of "I need your help" also from speaker 301 (not shown).

In some examples, system 200 receives audio input 201 while VR device 204 is providing a virtual reality. In some examples, VR device 204 provides a virtual reality by creating a view and displaying that view with a display of VR device 204. For example, when VR device 305 receives utterance 302 from speaker 301, VR device 305 may be creating and displaying a view of a virtual reality room or other environment to user 306. In some examples, system 200 determines whether to adjust the volume of an utterance of audio input 201 based on whether VR device 204 is providing a virtual reality, as discussed further below.

After receiving audio input 201, system 200 and in particular digital assistant 202 determines an identity of the speaker of the utterance based on a speaker profile. For example, digital assistant 202 may determine that the identity of speaker 301 is the user's grandfather, or may identify that the identity of speaker 301 is a person named "Brian" based on various voiceprints stored in a speaker profile associated with the user's grandfather and/or "Brian" as discussed further below.

In some examples, digital assistant 202 selects a voiceprint of the speaker profile and compares the voiceprint from the speaker profile to a voiceprint derived from the utterance to determine whether the speaker of the utterance matches the identity associated with the speaker profile. For example, digital assistant 202 may select one or more speaker profiles stored on VR device 204 or an associated server and then select a voiceprint from each speaker profile to compare to a voiceprint determined from utterance 302.

Digital assistant 202 may repeat this process for each speaker profile that digital assistant 202 has access to in order to determine which voiceprint from the total group of speaker profiles is most similar to the voiceprint derived from utterance 302. Thus, digital assistant 202 may first compare the voiceprint derived from utterance 302 to a voiceprint from a speaker profile associated with "Brian" and then compare the voiceprint derived from utterance 302 to a voiceprint from a speaker profile associated with "Chris" and so on until digital assistant finds a voiceprint from a speaker profile that is similar to the voiceprint derived from utterance 302. In other examples, digital assistant 202 may compare the voiceprint derived from utterance 302 to two or more speaker profiles in parallel.

In some examples, digital assistant 202 determines that the voiceprint derived from utterance 302 is similar to a voiceprint from a speaker profile when the voiceprints match within a predetermined threshold. For example, digital assistant 202 may determine that the voiceprint derived from utterance 302 matches a voiceprint from the speaker profile associated with "Brian" when the two voiceprints have a particular percentage (e.g., 50%, 55%, 65%, 75%, 85%) that is the same. Thus, digital assistant 202 may determine that the voiceprint derived from utterance 302 matches a voiceprint from the speaker profile and therefore determine that the identity of speaker 301 matches the identity of the speaker profile, in this case, "Brian."

In some examples, in addition or instead of a particular name the speaker profile may have a nickname, relation, or association to the user listed as the identity of the speaker. Thus, the speaker profile associated with "Brian" may also identify that the speaker is user 306's grandfather. Accordingly, the identity that is determined by digital assistant 202 may be user 306's grandfather in addition to or instead of the name "Brian."

In some examples, the voiceprint of the speaker profile was derived from a previous utterance received from the speaker. For example, during a prior interaction with user 306, speaker 301 may have provided one or more utterances such as "what are you doing?" "how are you?" and "it's so good to see you." VR device 305 or an associated accessory device can receive these utterances and digital assistant 202 may derive voiceprints from each of the utterances. User 306 may then associate with the derived voiceprints with a speaker profile for speaker 301 and provide digital assistant 202 with speaker 301's name and relation to the user (e.g., "Brian" and grandfather). Digital assistant 202 can then store the speaker profile for future reference.

In some examples, the voiceprint of the speaker profile is associated with context data corresponding to the previous utterance received from the speaker. For example, when the utterances are received from speaker 301 to create the speaker profile, digital assistant 202 may determine a time of day that the utterances were received, a location, and/or other context and annotate the voiceprints with this context data. In this way, digital assistant 202 may select voiceprints with similar context when determining the identity of speaker 301. For example, if utterance 302 of "what are you doing?" is received at user 306's home in the afternoon, digital assistant 202 can select voiceprints from speaker profiles that were also received at user 306's home in the afternoon to determine whether the voiceprint derived from utterance 302 matches an utterance of a speaker profile.

In some examples, the speaker profile associated with the speaker includes a plurality of voiceprints. In some examples, each of the plurality of voiceprints is associated with context data corresponding to an utterance from which the voiceprint is derived. Thus, a speaker profile associated with the identity "Brian" may have 5, 10, 20, 50, etc. voiceprints each of which are associated with context like the location and time that the utterance from which the voiceprint was derived were received. In this way each speaker profile may represent a wide variety of situations in which the speaker has provided utterances.

In some examples, the speaker profile is created for the speaker in a setup process for digital assistant 202 prior to receipt of audio input 201. For example, speaker 301 may also use digital assistant 202 on their own device that is associated with speaker 301. Accordingly, when speaker 301 starts using digital assistant 202, digital assistant 202 may lead speaker 301 through a setup process and create a speaker profile for speaker 301. This speaker profile may then be uploaded to a server or shared with other devices.

In some examples, the speaker profile is received from a second electronic device (e.g., a server) prior to receipt of audio input 201. For example, digital assistant 202 may store the speaker profile associated with speaker 301 on a server after creation, whether the speaker profile was created based on utterances received at VR device 305 associated with user 306 or at a device associated with speaker 301. Digital assistant 202 may then download or access the server to retrieve the speaker profile associated with speaker 301 when the speaker profile needs to be referenced to determine the identity of a speaker.

In some examples, the speaker profile is received from a third electronic device (e.g., another user device, a portable electronic device, a cell phone, a tablet, etc.) associated with the speaker prior to receipt of audio input 201. For example, when digital assistant 202 creates the speaker profile associated with speaker 301 during a setup process as discussed above, digital assistant 202 may broadcast the speaker profile to other nearby devices when they are detected. In this way, digital assistant 202 on speaker 301's device contacts digital assistant 202 on VR device 305 associated with user 306 and can provide the speaker profile associated with speaker 301 directly for easy access when an utterance from speaker 301 is received at VR device 305.

In some examples, determining an identity for the speaker of the utterance includes determining whether a picture or video input of the speaker matches a picture, video, or other representation associated with the speaker profile. For example, digital assistant 202 can use a camera of the electronic device (e.g., electronic device 100, VR device 305, etc.) to take a picture of the speaker providing audio input 201 and compare the picture to pictures associated with various profiles. When digital assistant 202 determines that the picture matches a picture associated with a particular profile within a predetermined threshold, digital assistant 202 may determine the identity of the speaker and that the speaker matches a predetermined identity.

In some examples, determining an identity for the speaker of the utterance includes determining whether the speaker is logged into a device with a user account. For example, the speaker may log into a device with a specific profile associated with an identity. The speakers device may then broadcast or transmit that identity to other nearby devices to indicate who the speaker is. Accordingly, when digital assistant 202 on the user's device receives the identity it may determine that any utterances coming from the speaker are associated with the received identity.

After determining an identity of the speaker of the utterance, digital assistant 202 determines whether the identity of the speaker matches a predetermined identity. In some examples, determining whether the identity of the speaker matches the predetermined identity includes determining whether the identity of the speaker is included in a set of identities associated with amplification. For example, digital assistant 202 may determine that the identity associated with speaker 301 of "Brian" is on a list of identities associated with amplification. Thus, digital assistant 202 may amplify or increase the volume of utterance 302 as described further below.

In some examples, determining whether the identity of the speaker matches the predetermined identity includes determining whether the speaker profile associated with the speaker includes an amplification property. For example, digital assistant 202 can determine that the speaker profile associated with the identity of "Brian" and thus speaker 301 includes a property that signals digital assistant 202 to amplify any utterances received from speaker 301. Accordingly, digital assistant 202 may amplify or increase the volume of utterance 302 as described further below.

In some examples, determining whether the identity of the speaker matches the predetermined identity includes determining whether the identity of the speaker is included in a set of identities associated with reduction. For example, digital assistant 202 may determine that the identity associated with speaker 303 of "Chris" is on a list of identities associated with reduction. Thus, digital assistant 202 may reduce or decrease the volume of utterance 304 as described further below.

In some examples, determining whether the identity of the speaker matches the predetermined identity includes determining whether the speaker profile associated with the speaker includes a reduction property. For example, digital assistant 202 can determine that the speaker profile associated with the identity of "Chris" and thus speaker 303 includes a property that signals digital assistant 202 to reduce any utterances received from speaker 303. Accordingly, digital assistant 202 may reduce or decrease the volume of utterance 304 as described further below.

In some examples, determining whether the identity of the speaker matches the predetermined identity includes determining whether the speaker profile associated with the speaker belongs to a predetermined group. For example, the user may specify that some members of a particular group such as the user's family should always be amplified. As another example, the user may specify that certain contacts from the user's contact list are attending a concert with them and thus should be amplified for a predetermined period of time (e.g., 8 hours).

In some examples, the predetermined group is based on a set of criteria defined by the user. The criteria can include a relationship to the user, a distance from the user, a noise level of provided utterances, etc. Thus the user may specify that all utterances provided from speakers within the user's contact list within two feet of the user should be amplified, as described in the example of attending a concert discussed above. In this way utterances that the user wishes to hear over the noise of the concert will be amplified while utterances provided from other speakers that the user does not know will be filtered out so that the user's experience at the concert is not interrupted. These predetermined groups and the criteria used to establish them may be altered by the user to provide a customizable experience without requiring the user to establish criteria for each individual speaker.

When digital assistant 202 determines that the identity of the speaker matches the predetermined identity then digital assistant 202 will selectively adjust a volume of the utterance relative to a volume of other sound of audio input 201 and provide output 209 of adjusted utterance 207. For example, when digital assistant 202 determines that the identity "Brian" is associated with amplification, digital assistant 202 will increase the volume of utterance 302 relative to the volume of the rest of that audio input such that utterance 302 will be louder (or at least relatively louder to other audio of audio input 201) than it was when received by VR device 305 and digital assistant 202. Digital assistant 202 will then provide user 306 with adjusted utterance 207 so that user 306 receives a version of utterance 302 that is increased in volume and not the original version of utterance 302.

In some examples, selectively adjusting the volume of the utterance includes determining a current volume of the utterance, determining an output volume of the utterance, and adjusting one or more characteristics of the utterance to increase the current volume to the output volume. For example, digital assistant 202 may determine that the current volume of utterance 302 is 45 dB and is therefore about 15 dB below the volume of a normal conversation. Digital assistant 202 may further determine that the output volume of the utterance (e.g., the volume of the utterance that user 306 would prefer) is 60 dB or the volume of a normal conversation. Accordingly, digital assistant 202 may raise the volume of the utterance from 45 dB to 60 dB by altering characteristics of the utterance such as the energy, ambient noise, sound pressure, reverberation, etc.

In some examples, selectively adjusting the volume of the utterance includes adjusting one or more characteristics of the utterance to decrease the current volume to the output volume. For example, digital assistant 202 may adjust the energy, ambient noise, sound pressure, reverberation, etc. of the utterance to decrease the volume of the utterance. Thus, when utterance 304 is received at a current volume of 80 dB and the output volume (e.g., the volume of the utterance that user 306 would prefer) is 60 dB, digital assistant 202 can reduce the energy to reduce the current volume to the output volume.

In some examples, selectively adjusting the volume of the utterance includes decreasing a current volume of the other sound of audio input 201 relative to the current volume of the utterance. For example, digital assistant 202 may determine that the entire audio input was received at a volume of 60 dB and reduce the volume of audio input 201 (e.g., the background noise or sound other than the utterance) to 45 dB while maintaining the volume of utterance 302 at 60 dB. This results in utterance 302 being easier to hear with respect to the other sound in audio input 201 and appearing to be louder in volume.

In some examples, selectively adjusting the volume of the utterance includes increasing a current volume of the other sound of audio input 201 relative to the current volume of the utterance. For example, digital assistant 202 may determine that the entire audio input was received at a volume of 60 dB and increase the volume of audio input 201 (e.g., the background noise or sound other than the utterance) to 75 dB while maintaining the volume of utterance 302 at 60 dB. This results in utterance 302 blending more with the other sound in audio input 201 and appearing to be quieter in volume.

In some examples, selectively adjusting the volume of the utterance includes increasing a current volume of the other sound of audio input 201 and the current volume of the utterance. For example, digital assistant 202 may determine that the entire audio input was received at a volume of 45 dB and increase the volume of audio input 201 (e.g., the background noise or sound other than the utterance) to 60 dB while increasing the volume of utterance 302 to 75 dB. This results in utterance 302 being easier to hear with respect to the other sound in audio input 201 and appearing to be louder in volume.

In some examples, selectively adjusting the volume of the utterance includes decreasing a current volume of the other sound of audio input 201 and the current volume of the utterance. For example, digital assistant 202 may determine that the entire audio input was received at a volume of 90 dB and decrease the volume of audio input 201 (e.g., the background noise or sound other than the utterance) to 60 dB while decreasing the volume of utterance 302 to 75 dB. This results in utterance 302 being easier to hear with respect to the other sound in audio input 201 and appearing to be louder in volume.

In some examples, selectively adjusting the volume of the utterance includes maintaining a volume of an audio output associated with the provided virtual reality. For example, digital assistant 202 may determine that adjusted utterance 207 is to be provided along with any audio output being provided with the virtual reality view. Accordingly, while digital assistant raises the volume of utterance 302 as discussed above it will also maintain the volume of any audio input being provided for the virtual reality view (e.g., scene).

In some examples, selectively adjusting the volume of the utterance includes decreasing a volume of an audio output associated with the provided virtual reality. For example, digital assistant 202 may determine that adjusted utterance 207 should be louder than any audio output provided with the virtual reality view. Accordingly, digital assistant 202 will reduce the volume of the audio output provided along with the virtual reality so that the user can better hear adjusted utterance 207.

In some examples, other audio parameters of the utterance may be selectively adjusted in addition to or instead of the volume. Exemplary audio parameters include the pitch or frequency of the utterance, the duration of the utterance, the timbre of the utterance, the position from which the utterance is originating from, or any aspect of a waveform representing the utterance (e.g., period, frequency, amplitude, wavelength, and speed). In this way, the utterance may be adjusted to with various audio filters to affect the output by adding features such as an echo, distortion, or reducing noise. Thus, the utterance may be filtered in such a way to provide unique and distinctive outputs to the user to provide more clear or interesting interactions.

In some examples, digital assistant 202 determines whether to selectively adjust the volume of the utterance based on whether VR device 204 is providing a virtual reality output. For example, when VR device 204 is providing the virtual reality output (e.g., the view) of a video game, digital assistant 202 may determine that the volume of utterance 302 should be increased so that user 306 will be made aware of the utterance. As another example, VR when VR device 204 is providing the virtual reality output (e.g., the view) of a work meeting, digital assistant 202 may determine that the volume of utterance 302 should not be increased or should be decreased so that user 306 will not be interrupted.

In some examples, digital assistant 202 determines whether to selectively adjust the volume of the utterance based on one or more speech characteristics of the utterance. For example, digital assistant 202 may determine that utterance 302 is more noisy than typical utterances and thus that the noise of utterance 302 should be reduced to increase the volume of utterance 302. As another example, digital assistant 202 may determine that utterance 304 has a higher energy than most utterances received and thus the energy of utterance 304 should be reduced to decrease the volume of utterance 304.

In some examples, digital assistant 202 determines whether to selectively adjust the volume of the utterance based on an application being executed on VR device 204. For example, as discussed above, if a particular application is being executed that indicates the user should not be interrupted, digital assistant 202 may forgo increasing or actually decrease the volume of the utterance so that the user is not interrupted.

It will be understood that system 200 and digital assistant 202 may combine these different factors when determining whether to adjust the volume of the utterance. Thus, digital assistant 202 may consider any combination of the identity of the speaker, whether VR device 204 is providing a virtual reality output, an application that VR device 204 is executing, and speech characteristics of the utterance to determine whether the volume of the utterance (e.g., utterance 302, 304) should be adjusted before being provided to the user operating (e.g., wearing) VR device 204.

In some examples, output 209 is provided by VR device 204. For example, when VR device 204 includes headphones, speakers, or other audio output devices, VR device 204 may directly provide adjusted utterance 207 to the user through the headphones, speakers, or other audio output devices. In some examples, output 209 is provided by accessory device 206. For example, when accessory device 206 is a pair of headphones connected to VR device 204, accessory device 206 will provide adjusted utterance 207 to the user.

In some examples, output 209 is provided by another device communicatively coupled to VR device 204 and system 200. For example, when user 306 has another electronic device such as a cell phone (not pictured) connected to system 200, digital assistant 202 may determine that adjusted utterance 207 should be provided through the cell phone.

In some examples, this process is repeated for different utterances received from different users. Thus, for the example depicted in FIG. 3, the system may determine an identity of speaker 301 based on a speaker profile associated with the identity "Brian" and determine an identity of speaker 303 based on a speaker profile associated with the identity "Chris." Each of the utterances provided by these respective speakers (e.g., utterance 302 and utterance 304 respectively) may then be selectively adjusted based on whether those identities match a predetermined identity as described above. Accordingly, utterance 302's volume may be increased while utterance 304's volume is decreased, utterance 302's volume may be maintained while utterance 304's volume is increased, etc.

It will be understood that this process may be repeated for any number of users and any number of utterances to determine how each of the utterances should be adjusted based on the identity of the speaker and the settings of the system.

Figure 4:
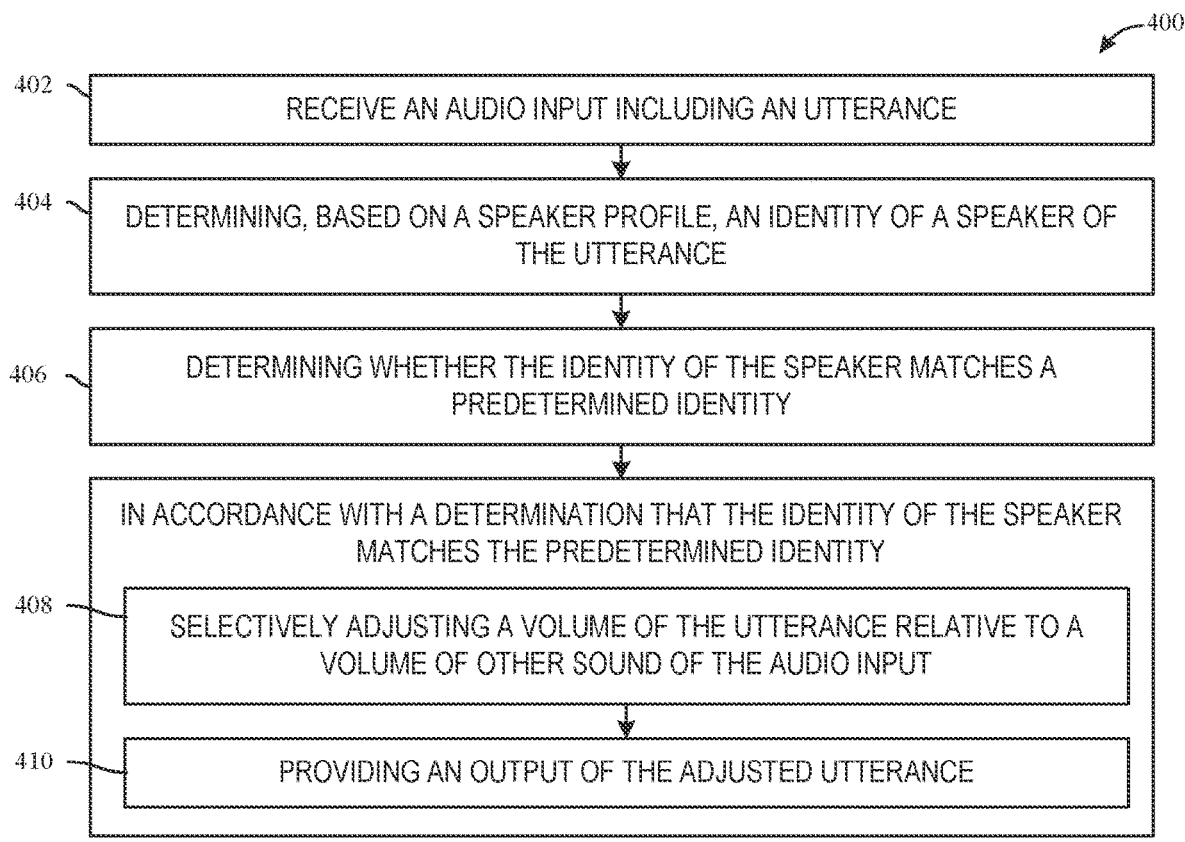
FIG. 4 depicts an exemplary flow diagram illustrating a method for selectively adjusting audio inputs, according to various examples.

FIG. 4 is a flow diagram illustrating a method for selectively adjusting audio inputs, according to various examples. Method 400 is performed at a device (e.g., device 100, 204, 206) with one or more input devices (e.g., a touchscreen, a mic, a camera), and a wireless communication radio (e.g., a Bluetooth connection, WiFi connection, a mobile broadband connection such as a 4G LTE connection). In some embodiments, the electronic device includes a plurality of cameras. In some examples, the device includes one or more biometric sensors which, optionally, include a camera, such as an infrared camera, a thermographic camera, or a combination thereof. Some operations in method 400 are, optionally, combined, the orders of some operations are, optionally, changed, and some operations are, optionally, omitted.

At step 402, an audio input (e.g., audio input 201) is received including an utterance (e.g., utterance 302, 304).

At step 404, an identity of a speaker (e.g., speaker 301, 303) of the utterance (e.g., utterance 302, 304) is determined based on a speaker profile. In some examples, determining, based on the speaker profile, the identity of the speaker of the utterance includes selecting a voiceprint of the speaker profile, comparing a voiceprint derived from the utterance to the selected voiceprint of the speaker profile and determining whether the speaker of the utterance matches an identity associated with the speaker profile based on the comparison of the voiceprints.

In some examples, the voiceprint selected from the speaker profile was derived from a previous utterance received from the speaker (e.g., speaker 301, 303). In some examples, the speaker profile is received from a second electronic device (e.g., electronic device 100) prior to receipt of the audio input (e.g., audio input 201). In some examples, the speaker profile is received from a third electronic device (e.g., electronic device 100) associated with the speaker prior to receipt of the audio input. In some examples, the voiceprint of the speaker profile is a first voiceprint of a plurality of voiceprints stored in associated with the speaker profile. In some examples, in accordance with a determination that the speaker of the utterance matches the speaker associated with the speaker profile the voiceprint derived from the utterance is added to the speaker profile associated with the speaker At step 406, whether the identity of the speaker (e.g., speaker 301, 303) matches a predetermined identity is determined. In some examples, determining whether the identity of the speaker matches the predetermined identity includes determining whether the identity of the speaker is included in a set of identities associated with amplification. In some examples, determining whether the identity of the speaker matches the predetermined identity includes determining whether the speaker profile associated with the speaker includes an amplification property.

At step 408, in accordance with a determination that the identity of the speaker (e.g., speaker 301, 303) matches the predetermined identity, a volume of the utterance (e.g., utterance 302, 304) is selectively adjusted relative to a volume of other sound of the audio input (e.g., audio input 201). In some examples, whether to selectively adjust the audio input is determined based on the determined identity, whether the electronic device is providing a virtual reality output, and one or more speech characteristics of the audio input. In some examples, whether to selectively adjust the audio input is determined based on an application of the electronic device (e.g., electronic device 100, VR device 204).

In some examples, selectively adjusting the volume of the utterance (e.g., utterance 302, 304) relative to the volume of other sound of the audio input (e.g., audio input 201) includes determining a current volume of the utterance, determining an output volume of the utterance, and adjusting one or more characteristics of the utterance to increase the current volume to the output volume. In some examples, selectively adjusting the volume of the utterance relative to the volume of other sound of the audio input includes decreasing the volume of the utterance. In some examples, selectively adjusting the volume of the utterance relative to the volume of other sound of the audio input includes decreasing the volume of the audio input.

At step 410 the output (e.g., output 209) of the adjusted utterance (e.g., adjusted utterance 207) is provided. In some examples, the output of the adjusted utterance is provided at an accessory device (e.g., accessory device 206) communicatively coupled to the electronic device (e.g., electronic device 100, VR device 204).

In some examples, the utterance (e.g., utterance 302, 304) is a first utterance (e.g., utterance 302, 304), the speaker profile is a first speaker profile, the speaker (e.g., speaker 301, 303) is a first speaker (e.g., speaker 301, 303), the identity is a first identity, and wherein the received audio input further includes a second utterance (e.g., utterance 302, 304). In some examples, a second identity of a second speaker (e.g., speaker 301, 303) of the second utterance is determined based on a second speaker profile, whether the second identity of the second speaker matches a second predetermined identity is determined, and in accordance with a determination that the second identity of the second speaker matches the second predetermined identity a volume of the second utterance relative to a volume of other sound of the audio input (e.g., audio input 201) is selectively adjusted. In some examples, the first utterance and the second utterance are received concurrently from different speakers.

In some examples, the volume of the audio input (e.g., audio input 201) is increased and a volume of an audio output associated with a provided virtual reality is maintained.

Figure 5:
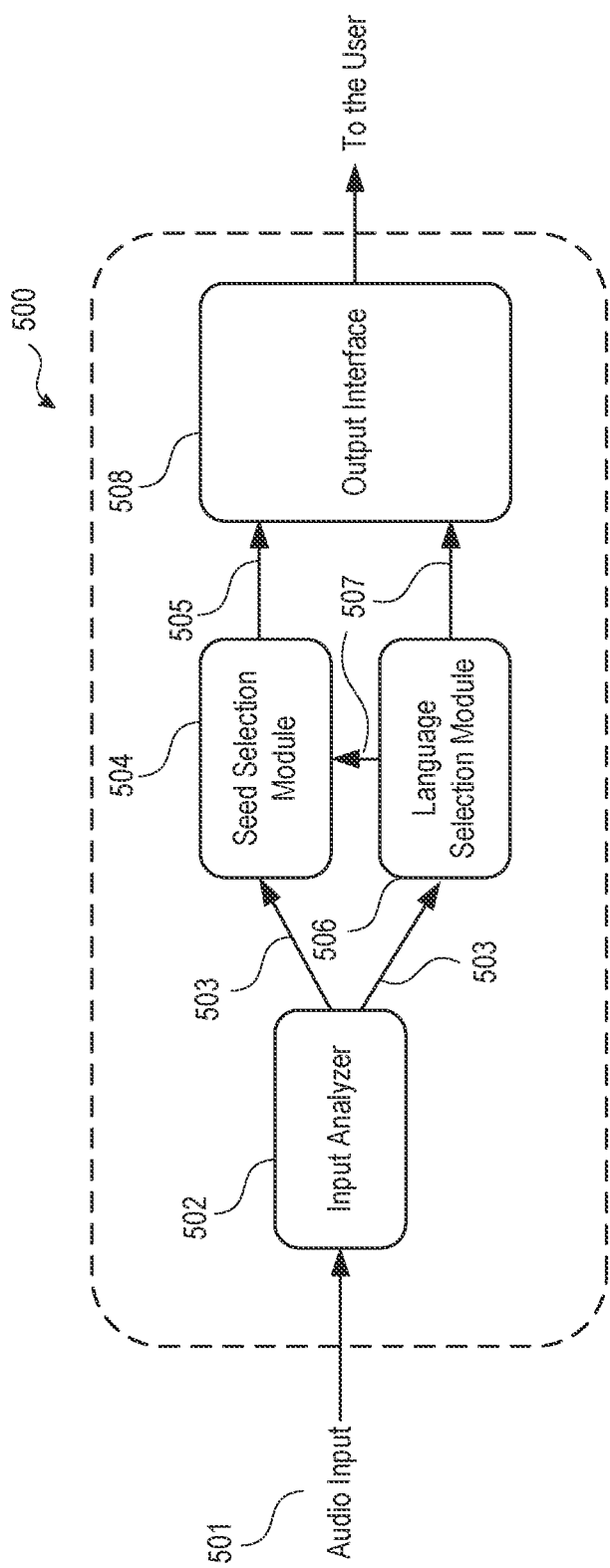
FIG. 5 depicts an exemplary system for providing interactive language simulations, according to various examples.

FIG. 5 depicts exemplary digital assistant 500 for providing interactive language simulations, according to various examples. In some examples, as illustrated in FIG. 5, digital assistant 500 includes input analyzer 502, seed selection module 504, language selection module 506, and output interface 508. In some examples, digital assistant 500 is implemented on electronic device 100. In some examples, digital assistant 500 is implemented across other devices (e.g., a server) in addition to electronic device 100. In some examples, some of the modules and functions of the digital assistant are divided into a server portion and a client portion, where the client portion resides on one or more user devices (e.g., electronic device 100) and communicates with the server portion through one or more networks.

It should be noted that digital assistant 500 is only one example of a digital assistant, and that digital assistant 500 can have more or fewer components than shown, can combine two or more components, or can have a different configuration or arrangement of the components. The various components shown in FIG. 5 are implemented in hardware, software instructions for execution by one or more processors, firmware, including one or more signal processing and/or application specific integrated circuits, or a combination thereof. In some examples, digital assistant 500 connects to one or more components and/or sensors of electronic device 100 as discussed further below.

Figure 6:
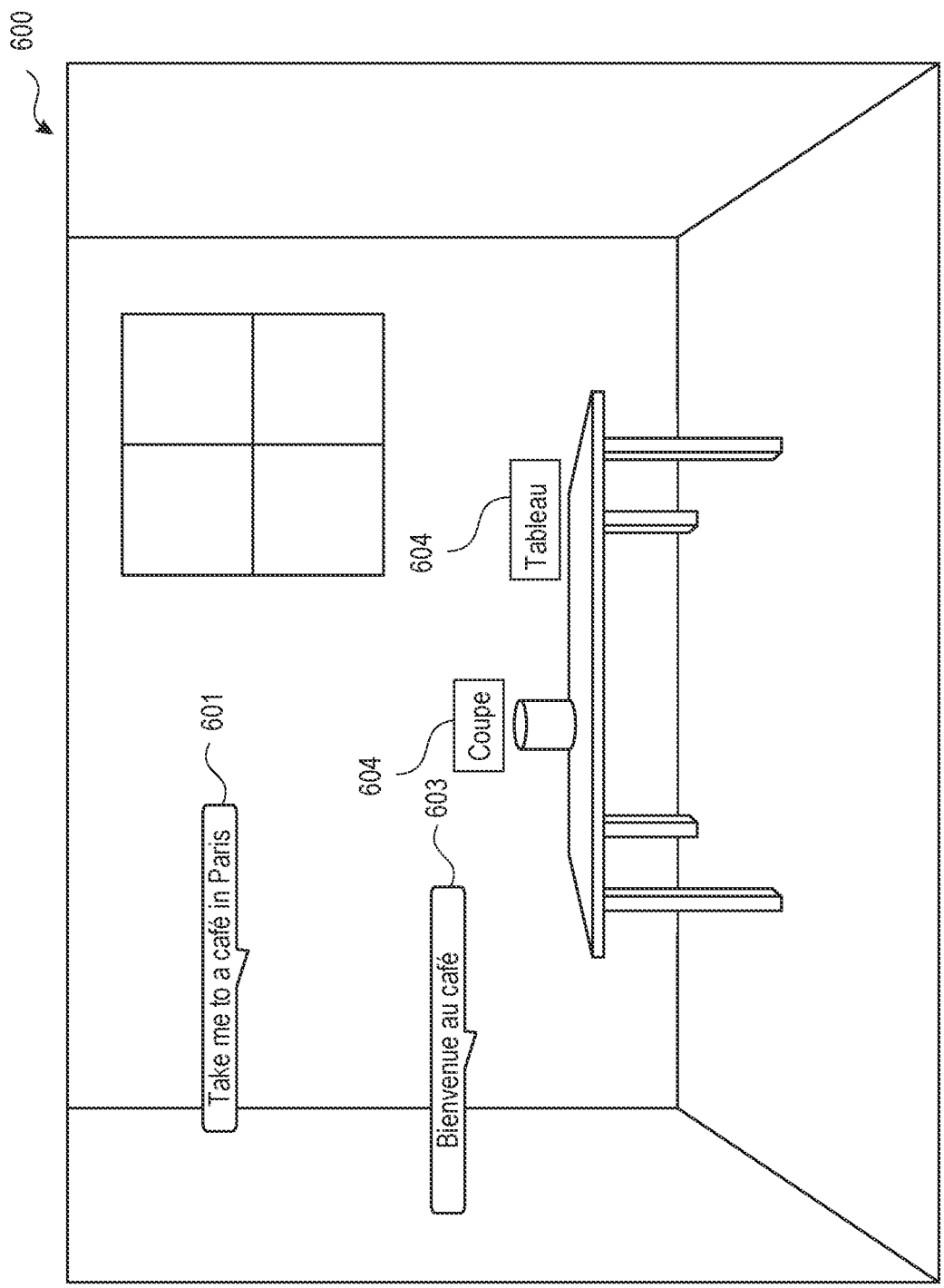
FIG. 6 depicts an exemplary view of an interactive language simulation, according to various examples.
Figure 7:
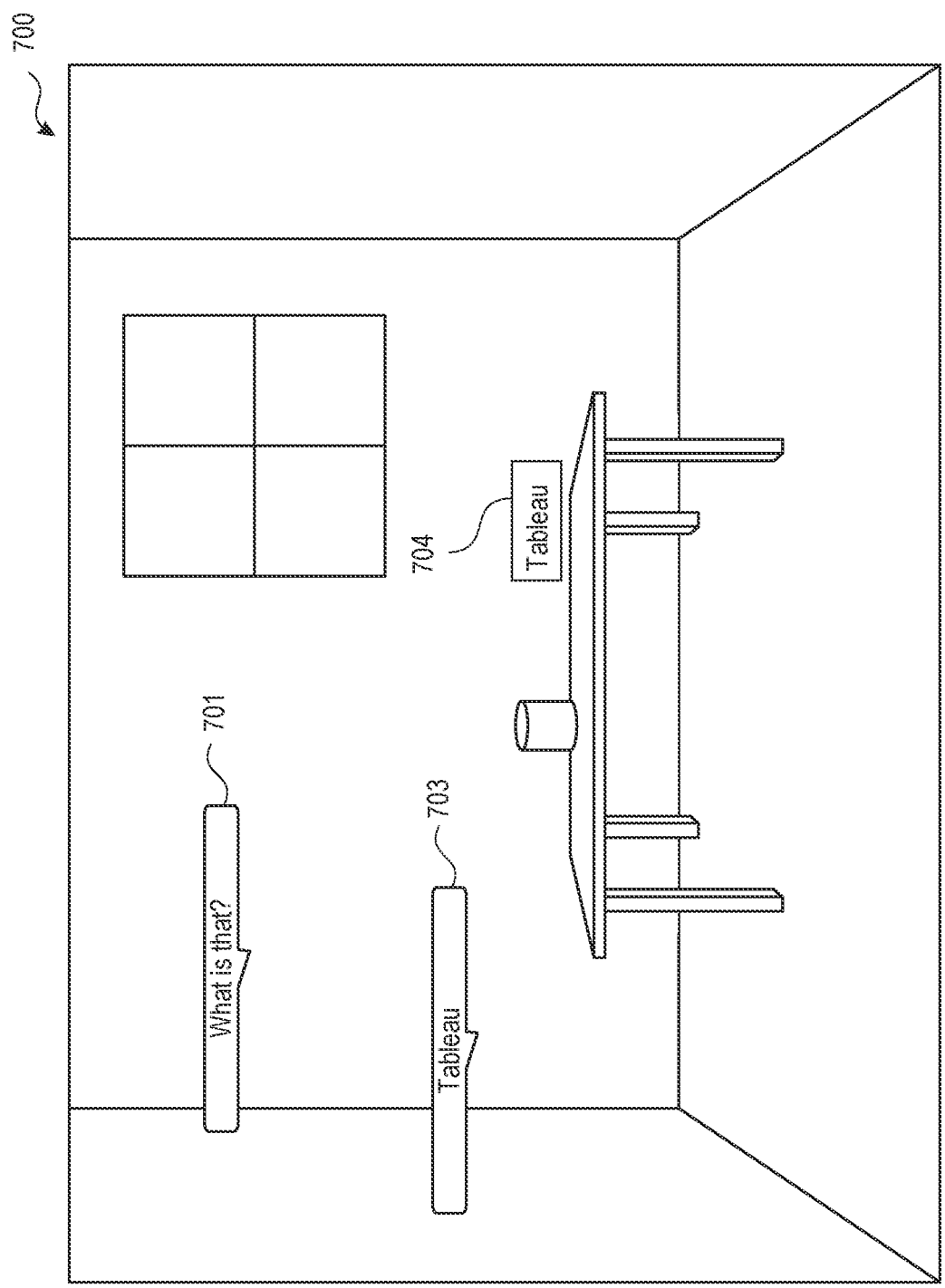
FIG. 7 depicts an exemplary view of an interactive language simulation, according to various examples.
Figure 8:
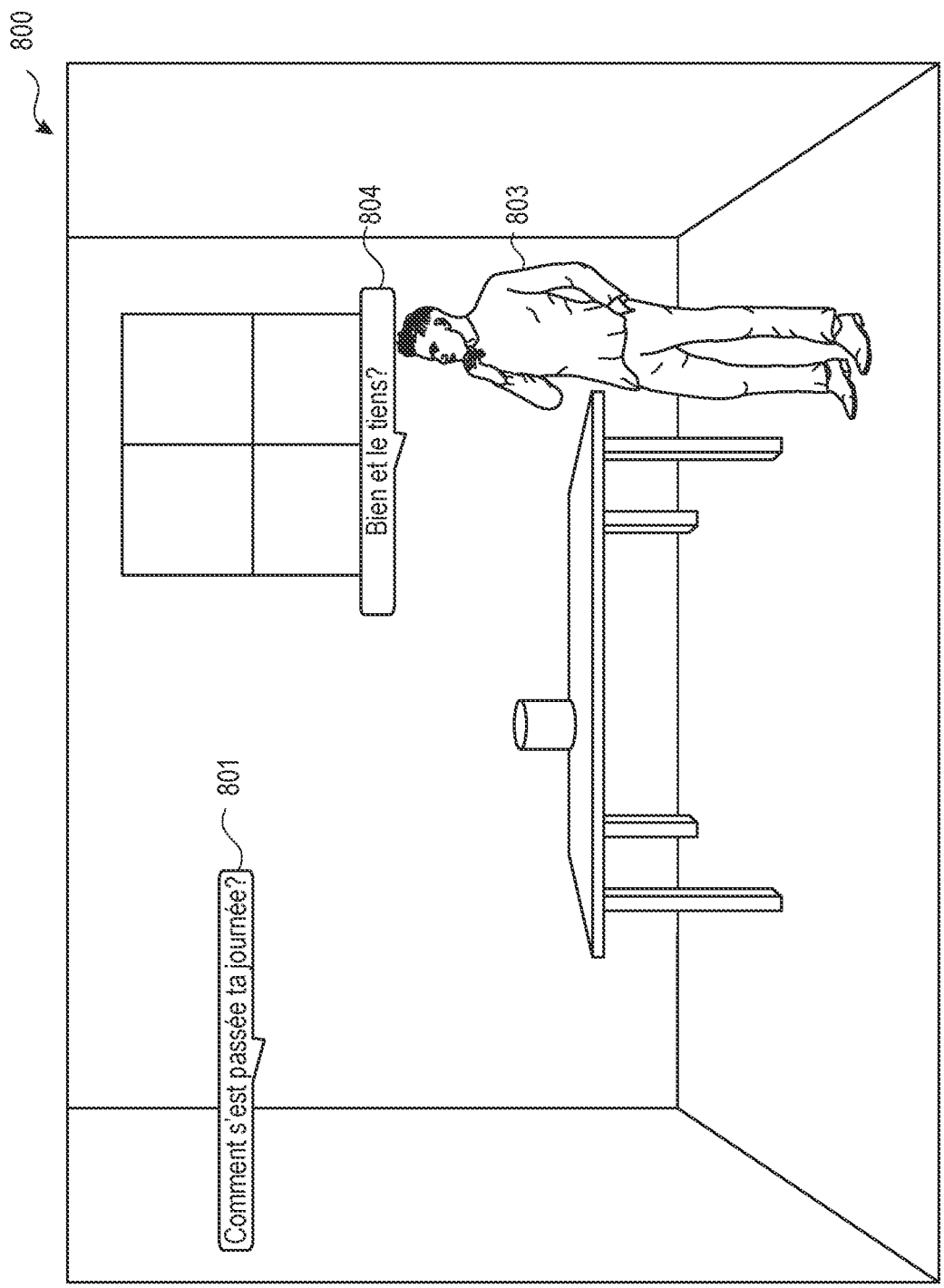
FIG. 8 depicts an exemplary view of an interactive language simulation, according to various examples.

FIGS. 6, 7, and 8 illustrate exemplary views 600, 700, and 800 provided by digital assistant 500 during interactive language simulations, according to various examples. FIG. 6 illustrates view 600 provided by digital assistant 500 based on audio input 601 including label 604 and audio output 603. FIG. 7 illustrates view 700 provided by digital assistant 500 that based on audio input 701 including label 704 and audio output 703. FIG. 8 illustrates view 800 provided by digital assistant 500 including digital assistant representation 803 and audio output 804 in response to audio input 801. FIGS. 6, 7, and 8 will be discussed alongside digital assistant 500 below as an illustrative example of digital assistant 500 processing user input to provide an interactive language simulation.

Digital assistant 500 receives audio input 501 including a user request in a first language at input analyzer 502. Input analyzer 502 then performs a semantic analysis on audio input 501 and provides the results of that semantic analysis to seed selection module 504 and language selection module 506 for further processing. In some examples, performing the semantic analysis includes performing automatic speech recognition (ASR) on audio input 501. In particular, input analyzer 502 can include one or more ASR systems that process audio input 501 received through input devices (e.g., a microphone) of electronic devices 100 and 600. The ASR systems extract representative features from the speech input. For example, a pre-processor of the ASR system performs a Fourier transform on the audio input 501 to extract spectral features that characterize the speech input as a sequence of representative multi-dimensional vectors.

Further, each ASR system of input analyzer 502 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognition results (e.g., phonemes, phonemic strings, and sub-words), and ultimately, text recognition results (e.g., words, word strings, or sequence of tokens).

In some examples, performing semantic analysis includes performing natural language processing on audio input 501. In particular, once input analyzer 502 produces recognition results containing a text string (e.g., words, or sequence of words, or sequence of tokens) through ASR, input analyzer may deduce an intent of audio input 501. In some examples, input analyzer 502 produces multiple candidate text representations of the speech input. Each candidate text representation is a sequence of words or tokens corresponding to audio input 501.

In some examples, each candidate text representation is associated with a speech recognition confidence score. Based on the speech recognition confidence scores, input analyzer 502 ranks the candidate text representations and provides the n-best (e.g., n highest ranked) candidate text representation(s) to other modules of digital assistant 500 for further processing. In some examples the speech recognition confidence scores may be ranked based on context data including the location of an electronic device, prior interaction history between the user and digital assistant 500, services the user has authorized digital assistant 500 to take, etc.

Input analyzer 502 then provides candidate intent 503 determined based on audio input 501 and in particular any user requests includes in audio input 501 to seed selection module 504 and language selection module 506 for further processing. For example, digital assistant 500 may receive audio input 601 of "take me to a café in Paris" and provide it to input analyzer 502 for processing. Input analyzer 502 determines that possible intents based on this request include booking a flight to Paris or providing a café in virtual reality. Based on prior interaction between the user and digital assistant 500, input analyzer 502 determines that the user is most likely providing an intent to create a café in virtual reality as the user has recently been learning French.

Seed selection module 504 will then determine based on candidate intent 503 (e.g., the user request) virtual environment 505 that is to be provided. Similarly, language selection module 506 will determined based on candidate intent 503 (e.g., the user request) second language 507 that is to be provided responsive to the user request.

In some examples, language selection module 506 determines second language 507 based on a location specified in the user request of audio input 501. For example, when audio input 601 of "take me to a café in Paris" is received input analyzer 502 may provide both "café" and "Paris" as possible locations to language selection module 506. Based on these locations included in audio input 501, language selection module 506 determines that second language 507 should be French because French is spoken in Paris.

In some examples, language selection module 506 determines second language 507 based on a location specified in the user request of audio input 501 and a requirement that second language 507 be different from the language corresponding to audio input 501. For example, digital assistant 500 may receive an audio input of "I'd like to go to Greenland," and input analyzer 502 will recognize Greenland as a location included in the audio input. Accordingly, language selection module 506 may determine that the mostly likely languages that correspond to Greenland are Danish and English. Because audio input 501 was received in English, language selection module 506 will identify that second language 507 is Danish because of the requirement that second language 507 be different from English.

In some examples, language selection module 506 determines second language 507 based on a language specified in audio input 501. For example, digital assistant 500 may receive an audio input of "teach me Japanese." In this case, input analyzer 502 will recognize "Japanese" as a language through natural language processing and provide that to language selection module 506. Accordingly, language selection module 506 will determine that second language 507 is Japanese.

In some examples, seed selection module 504 determines virtual environment 505 based a location specified in audio input 501. For example, when audio input 601 of "take me to a café in Paris" is received input analyzer 502 may provide both "café" and "Paris" as possible locations to seed selection module 504. Accordingly, seed selection module 504 can determine that virtual environment 505 should be a French café and should possible include details that identify the café as being located in Paris.

In some examples, seed selection module 504 determines virtual environment 505 based on second language 507. For example, when the audio input of "teach me Japanese" is received and language selection module 506 determines that second language 507 is Japanese, seed selection module 504 determines that virtual environment 505 should be a location in Japan such as a sushi restaurant.

In some examples, virtual environment 505 is a replica of a real location. Accordingly, when seed selection module 504 determines virtual environment 505 seed selection module 504 will select a seed corresponding to the real location. For example, when seed selection module 504 determines that virtual environment 505 is to be located in Paris, seed selection module 504 selects a seed that corresponds to Paris and thus may include data representing a real café in Paris, data representing important landmarks like the Eiffel Tower, and data of other real location in Paris.

In some examples, virtual environment 505 is a procedurally generated virtual environment and thus includes features that are generated based on the seed that do not necessarily replicate a real location. For example, when audio input 601 of "take me to a café in Paris" seed selection module 504 recognizes that the user did not specify a specific café and thus virtual environment 505 should resemble a French café but the features of the café including how it looks, the objects inside of it, the items sold, other people at the café, etc. can be generated based on the seed data and the rules included in the seed data rather than replicated based on a real location.

In some examples, virtual environment 505 is an augmented or mixed reality and includes real world features and objects as well as virtual objects determined (e.g., created) by seed selection module 504. For example, the user may be in a real world café or coffee shop and engage digital assistant 500 to provide virtual objects or labels for real world objects in a specific language like French or Japanese. Thus, in addition to an entirely virtual environment as discussed herein, digital assistant 500 may augment the user's world real location to provide an interactive and intuitive language immersion experience.

In some examples, virtual environment 505 is generated by seed selection module 504 based on the seed data and a predetermined set of rules included in or associated with the seed data. For example, a seed data for a café may have a predetermined set of rules that includes that the café should have a barista, have tables, have a coffee maker, etc. Thus, when seed selection module 504 selects the seed data for the café and generates virtual environment 505 seed selection module 504 will procedurally generate a café with a barista, at least two tables, and a coffee maker. As discussed further below the predetermined set of rules may include rules for the type of objects to include as well as properties of the objects or properties of the environment itself.

In some examples, the predetermined set of rules includes a rule specifying the types of objects to be generated. For example, as discussed above the set of rules can include one or more rules that specify that for a café the generated objects should include tables, chairs, coffee mugs, a coffee machine, pastries, etc. As another example, a set of rules for a seed data of a library may include one or more rules that specify that the generated objects should include books, shelves, tables, computers, etc.

In some examples, the predetermined set of rules includes a rule specifying deterministic parameters for the one or more virtual objects that are created in virtual environment 505. For example, the set of rules for the café seed data may include a rule specifying the number of chairs, the size of a chair to be created, a color of a coffee mug, or any other parameters for the objects that are to be procedurally generated with the virtual environment 505 of a café.

In some examples, the one or more virtual objects are determined based on the user request. For example, when the user request is "take me to a café in Paris" seed selection module 504 determines that the objects should be objects typically found in a café such as coffee mugs, tables, books, etc. As another example, if the user request is "I want to eat a sandwich in a café" seed selection module 504 determines that one of the objects is a sandwich and creates a virtual sandwich to place in virtual environment 505.

In some examples, the one or more virtual objects are determined based on second language 507. For example, when second language 507 is determined to be French (e.g., based on the location of Paris as discussed above) seed selection module 504 determines that the objects to be generated should include objects typically found in French cafés such as croissants, espresso, crepes, etc.

In some examples, the one or more virtual objects are determined based on a user profile associated with the user that provided audio input 501. For example, the user may include in their profile that they like to bicycle or prefer to eat donuts instead of croissants. Accordingly, digital assistant 500 can provide seed selection module 504 with this information so that seed selection module 504 generates bicycles and donuts in the virtual reality that will be provided as view 602.

In some examples, the one or more virtual objects are determined based on contextual data associated with the user that provided audio input 501. Contextual data associated with the user may include a calendar of the user, history of the user's location, the user's e-mail, travel itineraries of the user, conversations between the user and other users, usage patterns of the user, and other types of data that digital assistant 500 may collect as the user interacts with electronic device 600 or other electronic devices. Accordingly, when determining objects to be generated seed selection module 504 may reference this data and select objects to be generated. For example, contextual data may indicate that the user has recently been taking lessons on playing the guitar and that their upcoming trip to Europe includes taking a train. Thus, seed selection module 504 generates a guitar and a train pamphlet within virtual environment 505 so that objects the user may have interest in are included in virtual environment 505.

In some examples, the one or more virtual objects are determined based on interaction history between the user that provided audio input 501 and digital assistant 500. For example, the user may have asked digital assistant 500 to locate someone who can provide guitar lessons or to look up the train schedule from Paris to London. Accordingly, seed selection module 504 may generate a guitar and a train schedule to include within virtual environment 505 given the user's apparent interest in these objects.

After generating virtual environment 505, digital assistant 500 provides virtual environment 505 to output interface 508. Output interface 508 can then determine labels for one or more of the objects included in virtual environment 505 using second language 507. Output interface 508 then provides virtual environment 505 with the objects labeled in second language 507 as well as spoken output 509 using second language 507. The outputs provided by output interface 508 including the labels and spoken output 509 may be provided automatically or upon being prompted by the user, as discussed further below.

In some examples, the outputs provided by output interface 508 are provided automatically in response to the user's initial audio input 501. For example, as shown in FIG. 6, audio input 601 of "take me to a café in Paris" is received from the user and in response digital assistant 500 generates and provides virtual environment 505 as view 600 of a French café including various objects such as a coffee mug and a table that are labeled in French with labels 604 in response to audio input 601 without any intervening inputs from the user. Digital assistant 500 may further provide audio output 603 of "Bienvenue au café" ("welcome to the café") automatically to the user as well, along with view 602.

In some examples, one or more of the outputs provide by output interface 508 are provided in response to detecting an input referencing an object of virtual environment 505. For example, as shown in FIG. 7, while view 700 is being provided of virtual environment 505 the user may provide audio input 701 of "what's that?" while looking at the virtual table. In response, output interface 508 can provide label 704 providing the word for table in French. Additionally, or alternatively, digital assistant 500 can provide audio output 703 of "tableau" in response to audio input 701.

In some examples, the input referencing the object is a gesture such as a nod, point, or wave at an object of virtual environment 505. Electronic device 100 and digital assistant 500 may detect the gesture provided by the user with one or more sensors of electronic device 100 including one or more cameras, altimeters, speedometers, or other motion sensors of electronic device 100.

In some examples, the input referencing the object is an audio input, such as audio input 701 described above. Digital assistant 500 may determine which object the user is reference to with the audio input based on a gaze of the user which can be detected based on sensors of electronic device 100 like those discussed above.

In some examples, the audio input may be provided in the second language and the outputs provided by output interface 508 may be in the first language. For example, while the user is engaging with virtual environment 505 the user may provide the audio input "coupe" when referring to a cup being displayed in virtual environment 505. In response, output interface 508 may display a label over the cup with the word "cup" or an audio output of "cup" to confirm that the user was correct. In some examples, the output is provided in the second language to provide this confirmation and thus when the user provides the input of "coupe" the label and the audio output will also be "coupe."

In some examples, an audio output provided by output interface 508 includes a pronunciation of the object being referenced or an evaluation of the user's pronunciation in the provided input. For example, if the user provides the audio input "coupe" digital assistant 500 may determine if the user's pronunciation was correct and provide the appropriate output. Thus, if the user's pronunciation was correct output interface 508 may provide the audio output "That's right!" In contrast, if the user's pronunciation was incorrect output interface 508 may provide that audio output "that's not quite right, try coupe," with the correct pronunciation. In this way the user may interact with digital assistant 500 to learn the desired language.

In some examples, a virtual representation of digital assistant 500 is generated and provided in the virtual environment. For example, as shown in FIG. 8, view 800 provided by digital assistant 500 can include digital assistant representation 803 as an object. The virtual representation of digital assistant 500 can then provide audio outputs and move as if speaking to provide the user with a virtual person to interact with in second language 507. Accordingly, digital assistant 500 (e.g., digital assistant representation 803) can receive audio input 801 of "comment s'est passée to journée?" (how was your day?) from the user and provide the appropriate response through digital assistant representation 803 as audio output 804 of "bien et le tiens?" ("good and yours?"). This again provides an interactive way for the user to learn second language 507 by interacting with the digital assistant in a conversation like interface.

In some examples, while providing the virtual environment digital assistant 500 receives an audio input including a request to change virtual environment 505. Based on this audio input, digital assistant 500 determines one or more properties of virtual environment 505 to change and provides an updated virtual environment 505 including the change. For example, digital assistant 500 may receive the audio input "make the chair blue" and thus determine that a chair in virtual environment 505 should be changed from the current color to blue. Accordingly, digital assistant 500 can change the color of the chair to blue in virtual environment 505 that is being provided to the user as an output.

In some examples, the one or more properties of virtual environment 505 to change are one or more properties of an object as discussed above. In some examples, the one or more properties of virtual environment 505 to change are a location of virtual environment 505. For example, while providing virtual environment 505 of a café digital assistant 500 may receive the input "take me to a train station." Accordingly, digital assistant 500 may cause seed selection module 504 to select a new seed for a train station and generate a new virtual environment 505 based on the new seed. The new virtual environment 505 of a train station may then be provided as an output to the user.

Digital assistant 500 may use the methods discussed above to determine and provide an interactive language simulator to a user so that a user may interact with full virtual environments in a new language and thus have an immersive learning experience.

Figure 9:
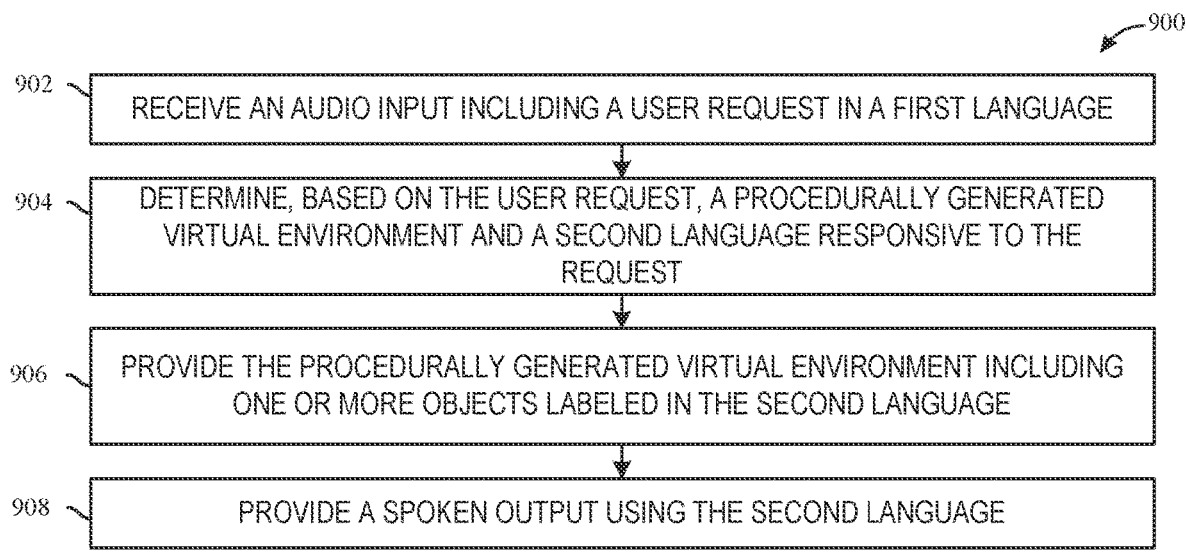
FIG. 9 depicts an exemplary flow diagram illustrating a method for providing interactive language simulations, according to various examples.

FIG. 9 is a flow diagram illustrating a method for providing interactive language simulations, according to various examples. Method 900 is performed at a device (e.g., device 100) with one or more input devices (e.g., a touchscreen, a mic, a camera), and a wireless communication radio (e.g., a Bluetooth connection, WiFi connection, a mobile broadband connection such as a 4G LTE connection). In some embodiments, the electronic device includes a plurality of cameras. In some examples, the device includes one or more biometric sensors which, optionally, include a camera, such as an infrared camera, a thermographic camera, or a combination thereof. Some operations in method 900 are, optionally, combined, the orders of some operations are, optionally, changed, and some operations are, optionally, omitted.

At step 902, an audio input (e.g., audio input 501, 601, 701, 801) including a user request in a first language is received.

At step 904, a procedurally generated virtual environment (e.g., virtual environment 505) and a second language (e.g., second language 507) are determined based on the user request. In some examples, determining, based on the user request, the procedurally generated virtual environment and a second language responsive to the request includes determining the second language from the user request with natural language processing, determining a location corresponding to the second language, and generating the virtual environment based on the determined location. In some examples, determining, based on the user request, the procedurally generated virtual environment and a second language responsive to the request includes determining a location based on the user request and generating the virtual environment based on the location. In some examples, generating the virtual environment includes determining a seed corresponding to the location and procedurally generating the virtual environment including one or more virtual objects based on the seed and the predetermined set of rules.

In some examples, the predetermined set of rules includes a rule specifying types of objects to be generated. In some examples, the predetermined set of rules includes a rule specifying deterministic parameters for the one or more virtual objects. In some examples, the one or more virtual objects are determined based on the user request. In some examples, the one or more virtual objects are determined based on the second language. In some examples, the one or more virtual objects are determined based on a user profile. In some examples, the one or more virtual objects are determined based on an interaction history between the user and a digital assistant. In some examples, the one or more virtual objects are determined based on contextual data associated with a user.

At step 906 the procedurally generated virtual environment (e.g., virtual environment 505) including one or more objects labeled in the second language (e.g., second language 507) are provided. In some examples, an input referencing (e.g., audio input 501, 601, 701, 801) a first object of the one or more virtual objects is detected and an output (e.g., audio output 603, 703, 804, labels 604, 704) corresponding to the first object is provided in response to detecting the input referencing the first object. In some examples, the corresponding to the first object includes providing a label corresponding to the first object with the first language (e.g., labels 604, 704). In some examples, the input referencing the first object includes a pronunciation of the first object in the second language. In some examples, the output corresponding to the first object includes an evaluation of the pronunciation of the first object.

At step 908, a spoken output (e.g., audio output 603, 703, 804) using the second language (e.g., second language 507). In some examples a virtual representation (e.g., virtual representation 803) of a digital assistant (e.g., digital assistant 500) is generated and provided in the virtual environment (e.g., virtual environment 505, view 600, 700, 800). In some examples, a second audio input (e.g., audio input 501, 601, 701, 801) is received in the second language and a response in the second language is provided in response to the second audio input with the virtual representation of the digital assistant. In some examples, while providing the virtual environment a third audio input including a request to change the virtual environment is received, one or more properties of the virtual environment to change are determined based on the request, and an updated virtual environment is provided after changing the one or more properties of the virtual environment. In some examples, the one or more properties of the virtual environment to change are one or more properties of the one or more objects. In some examples, the one or more properties of the virtual environment to change are the location of the virtual environment.

As described above, one aspect of the present technology is the gathering and use of data available from various sources to improve the delivery to users of content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of information delivery services, the present technology can be configured to allow users to select to "opt in" or "opt out" of participation in the collection of personal information data during registration for services or anytime thereafter. In another example, users can select not to provide user information for deliver services. In yet another example, users can select to limit the length of time user information is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app. Moreover, the present disclosure contemplates that some personal information may be kept locally on the users device and blocked from being sent or accessed by other devices of an ecosystem to ensure the user's privacy.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A non-transitory computer-readable storage medium storing one or more programs configured to be executed by one or more processors of an electronic device, the one or more programs including instructions for:
   receiving an audio input including a user request in a first language;
   determining a location included in the user request and a second language responsive to the request based on the location included in the user request;
   procedurally generating a virtual environment including one or more virtual objects based on a seed corresponding to the location and a predetermined set of rules;
   providing the procedurally generated virtual environment including the one or more objects labeled in the second language; and
   providing a spoken output using the second language.

2. The non-transitory computer-readable storage medium of claim 1, the one or more programs further including instructions for:
   determining the second language from the user request with natural language processing; and
   generating the virtual environment based on the determined location.

3. The non-transitory computer-readable storage medium of claim 1, wherein the predetermined set of rules includes a rule specifying types of objects to be generated.

4. The non-transitory computer-readable storage medium of claim 1, wherein the predetermined set of rules includes a rule specifying deterministic parameters for the one or more virtual objects.

5. The non-transitory computer-readable storage medium of claim 1, wherein the one or more virtual objects are determined based on the user request.

6. The non-transitory computer-readable storage medium of claim 1, wherein the one or more virtual objects are determined based on the second language.

7. The non-transitory computer-readable storage medium of claim 1, wherein the one or more virtual objects are determined based on a user profile.

8. The non-transitory computer-readable storage medium of claim 1, wherein the one or more virtual objects are determined based on an interaction history between the user and a digital assistant.

9. The non-transitory computer-readable storage medium of claim 1, wherein the one or more virtual objects are determined based on contextual data associated with a user.

10. The non-transitory computer-readable storage medium of claim 1, the one or more programs further including instructions for:
    detecting an input referencing a first object of the one or more virtual objects; and
    in response to detecting the input referencing the first object, providing an output corresponding to the first object.

11. The non-transitory computer-readable storage medium of claim 10, wherein the output corresponding to the first object includes providing a label corresponding to the first object with the first language.

12. The non-transitory computer-readable storage medium of claim 11, wherein the input referencing the first object includes a pronunciation of the first object in the second language.

13. The non-transitory computer-readable storage medium of claim 12, wherein the output corresponding to the first object includes an evaluation of the pronunciation of the first object.

14. The non-transitory computer-readable storage medium of claim 1, the one or more programs further including instructions for:
    generating a virtual representation of a digital assistant; and
    providing the virtual representation of the digital assistant in the virtual environment.

15. The non-transitory computer-readable storage medium of claim 14, the one or more programs further including instructions for:
- receiving a second audio input in the second language; and
- providing a response, in the second language, to the second audio input with the virtual representation of the digital assistant.

16. The non-transitory computer-readable storage medium of claim 1, the one or more programs further including instructions for:
- while providing the virtual environment:
  - receiving a third audio input including a request to change the virtual environment;
  - determining one or more properties of the virtual environment to change based on the request; and
  - providing an updated virtual environment after changing the one or more properties of the virtual environment.

17. The non-transitory computer-readable storage medium of claim 16, wherein the one or more properties of the virtual environment to change are one or more properties of the one or more objects.

18. The non-transitory computer-readable storage medium of claim 16, wherein the one or more properties of the virtual environment to change are the location of the virtual environment.

19. An electronic device comprising:
- one or more processors;
- a memory; and
- one or more programs, wherein the one or more programs are stored in the memory and configured to be executed by the one or more processors, the one or more programs including instructions for:
  - receiving an audio input including a user request in a first language;
  - determining a location included in the user request and a second language responsive to the request based on the location included in the user request;
  - procedurally generating a virtual environment including one or more virtual objects based on a seed corresponding to the location and a predetermined set of rules;
  - providing the procedurally generated virtual environment including the one or more objects labeled in the second language; and
  - providing a spoken output using the second language.

20. The electronic device of claim 19, the one or more programs further including instructions for:
- determining the second language from the user request with natural language processing; and
- generating the virtual environment based on the determined location.

21. The electronic device of claim 19, wherein the predetermined set of rules includes a rule specifying types of objects to be generated.

22. The electronic device of claim 19, wherein the predetermined set of rules includes a rule specifying deterministic parameters for the one or more virtual objects.

23. The electronic device of claim 19, wherein the one or more virtual objects are determined based on the user request.

24. The electronic device of claim 19, wherein the one or more virtual objects are determined based on the second language.

25. The electronic device of claim 19, wherein the one or more virtual objects are determined based on a user profile.

26. The electronic device of claim 19, wherein the one or more virtual objects are determined based on an interaction history between the user and a digital assistant.

27. The electronic device of claim 19, wherein the one or more virtual objects are determined based on contextual data associated with a user.

28. The electronic device of claim 19, the one or more programs further including instructions for:
- detecting an input referencing a first object of the one or more virtual objects; and
- in response to detecting the input referencing the first object, providing an output corresponding to the first object.

29. The electronic device of claim 28, wherein the output corresponding to the first object includes providing a label corresponding to the first object with the first language.

30. The electronic device of claim 28, wherein the input referencing the first object includes a pronunciation of the first object in the second language.

31. The electronic device of claim 30, wherein the output corresponding to the first object includes an evaluation of the pronunciation of the first object.

32. The electronic device of claim 19, the one or more programs further including instructions for:
- generating a virtual representation of a digital assistant; and
- providing the virtual representation of the digital assistant in the virtual environment.

33. The electronic device of claim 32, the one or more programs further including instructions for:
- receiving a second audio input in the second language; and
- providing a response, in the second language, to the second audio input with the virtual representation of the digital assistant.

34. The electronic device of claim 19, the one or more programs further including instructions for:
- while providing the virtual environment:
  - receiving a third audio input including a request to change the virtual environment;
  - determining one or more properties of the virtual environment to change based on the request; and
  - providing an updated virtual environment after changing the one or more properties of the virtual environment.

35. The electronic device of claim 34, wherein the one or more properties of the virtual environment to change are one or more properties of the one or more objects.

36. The electronic device of claim 34, wherein the one or more properties of the virtual environment to change are the location of the virtual.

37. A method, comprising:
- at an electronic device with one or more processors and memory:
  - receiving an audio input including a user request in a first language
  - determining a location included in the user request and a second language responsive to the request based on the location included in the user request;
  - procedurally generating a virtual environment including one or more virtual objects based on a seed corresponding to the location and a predetermined set of rules;
  - providing the procedurally generated virtual environment including the one or more objects labeled in the second language; and
  - providing a spoken output using the second language.

38. The method of claim 37, further comprising:
   determining the second language from the user request with natural language processing; and
   generating the virtual environment based on the determined location.

39. The method of claim 37, wherein the predetermined set of rules includes a rule specifying types of objects to be generated.

40. The method of claim 37, wherein the predetermined set of rules includes a rule specifying deterministic parameters for the one or more virtual objects.

41. The method of claim 37, wherein the one or more virtual objects are determined based on the user request.

42. The method of claim 37, wherein the one or more virtual objects are determined based on the second language.

43. The method of claim 37, wherein the one or more virtual objects are determined based on a user profile.

44. The method of claim 37, wherein the one or more virtual objects are determined based on an interaction history between the user and a digital assistant.

45. The method of claim 37, wherein the one or more virtual objects are determined based on contextual data associated with a user.

46. The method of claim 37, the one or more programs further including instructions for:
   detecting an input referencing a first object of the one or more virtual objects; and
   in response to detecting the input referencing the first object, providing an output corresponding to the first object.

47. The method of claim 46, wherein the output corresponding to the first object includes providing a label corresponding to the first object with the first language.

48. The method of claim 46, wherein the input referencing the first object includes a pronunciation of the first object in the second language.

49. The method of claim 48, wherein the output corresponding to the first object includes an evaluation of the pronunciation of the first object.

50. The method of claim 37, further comprising:
   generating a virtual representation of a digital assistant; and
   providing the virtual representation of the digital assistant in the virtual environment.

51. The method of claim 50, further comprising:
   receiving a second audio input in the second language; and
   providing a response, in the second language, to the second audio input with the virtual representation of the digital assistant.

52. The method of claim 37, further comprising:
   while providing the virtual environment:
      receiving a third audio input including a request to change the virtual environment;
      determining one or more properties of the virtual environment to change based on the request; and
      providing an updated virtual environment after changing the one or more properties of the virtual environment.

53. The method of claim 52, wherein the one or more properties of the virtual environment to change are one or more properties of the one or more objects.

54. The method of claim 52, wherein the one or more properties of the virtual environment to change are the location of the virtual.

\* \* \* \* \*

UNITED STATES PATENT AND TRADEMARK OFFICE
CERTIFICATE OF CORRECTION

PATENT NO. : 11,935,168 B1
APPLICATION NO. : 17/714590
DATED : March 19, 2024
INVENTOR(S) : Shiraz Akmal, Aaron M. Burns and Brad K. Herman It is certified that error appears in the above-identified patent and that said Letters Patent is hereby corrected as shown below:

In the Claims

Claim 12, Column 26, Line 54:
Please delete "claim 11" and insert --claim 10--.

Signed and Sealed this
Thirtieth Day of April, 2024

Katherine Kelly Vidal
*Director of the United States Patent and Trademark Office*